March 26, 1946. W. F. KRENZKE 2,397,457
MOTOR FUEL POWER INDUCTION DEVICE
Filed Jan. 4, 1943 4 Sheets-Sheet 1

INVENTOR.
WILLIAM F. KRENZKE
BY
ATTORNEY

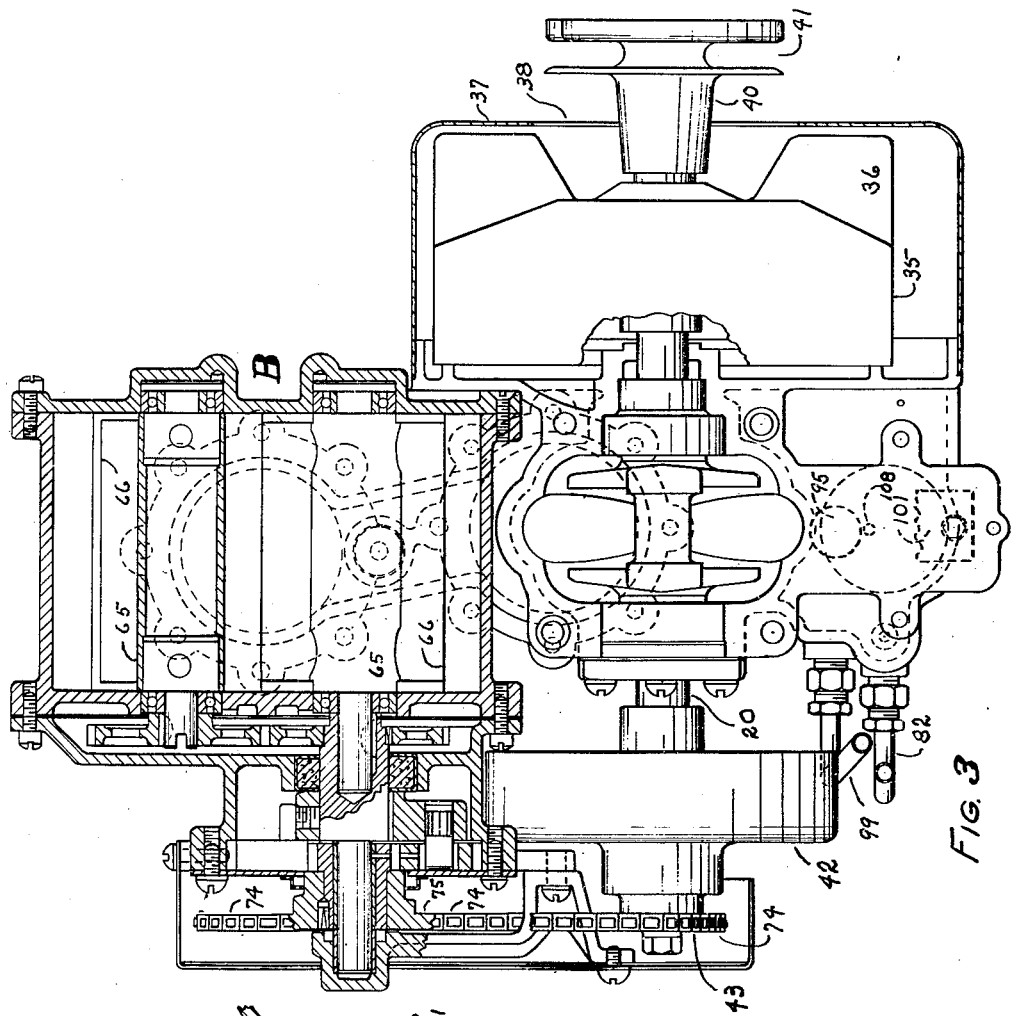

March 26, 1946.  W. F. KRENZKE  2,397,457
MOTOR FUEL POWER INDUCTION DEVICE
Filed Jan. 4, 1943  4 Sheets-Sheet 4
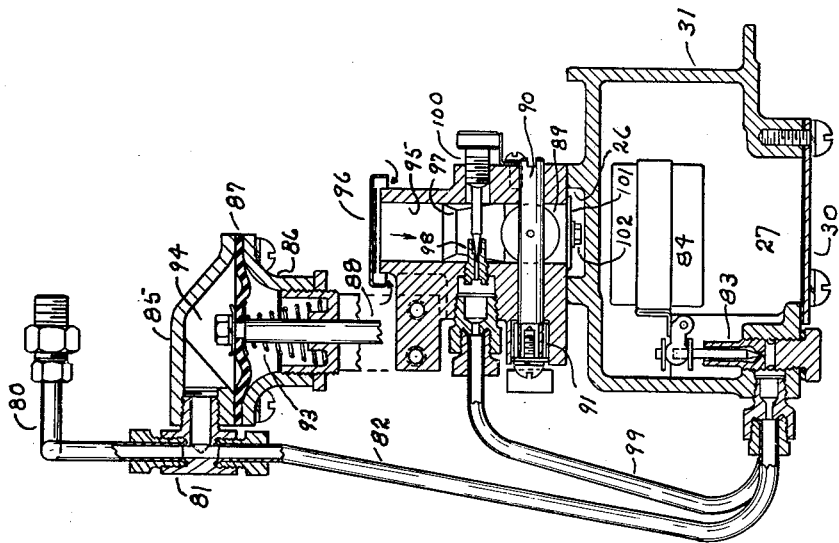
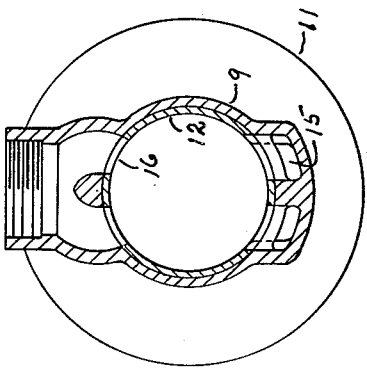
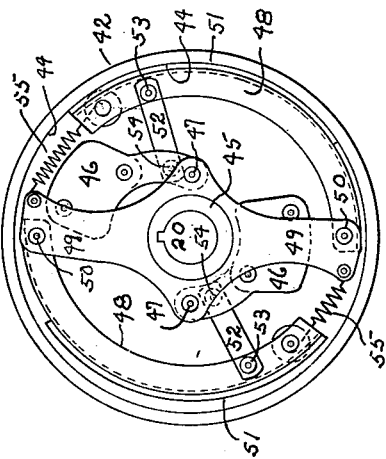
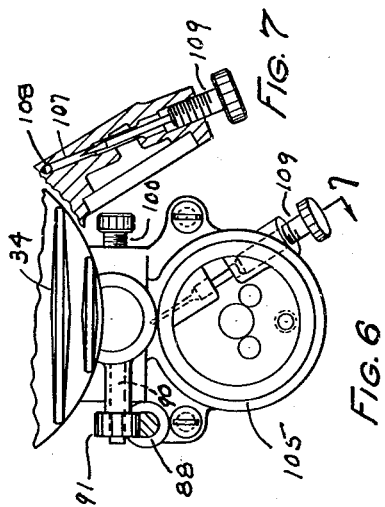
INVENTOR.
WILLIAM F. KRENZKE
BY
ATTORNEY Patented Mar. 26, 1946

2,397,457

UNITED STATES PATENT OFFICE 2,397,457

MOTOR FUEL POWER INDUCTION DEVICE

William F. Krenzke, Racine, Wis., assignor to Jacobsen Manufacturing Company, Racine, Wis., a company of Wisconsin Application January 4, 1943, Serial No. 471,292

4 Claims. (Cl. 103—23)

The present invention relates to miniature automatically operated and manually transported power units for the induction of motor fuel into the fuel tanks of airplanes, army tanks and the like from fuel barrels of the type commonly used for transporting and moving the fuel to and about airports and army camps.

The general practice in the use of my device is to move the fuel containers to the device to be serviced and then impel the fuel from the container into the fuel tanks.

An object of the present invention is to provide an internal combustion engine having a fuel impelling pump with regulating means whereby when the delivery nozzle is closed, the speed of the engine will be considerably reduced or stopped, the pump being driven from the engine by means of a centrifugally controlled clutch so the pump discontinues to operate when the speed of the engine is sufficiently reduced or stopped.

A further object of my invention is to provide a power device of the character which is very light and can be easily carried by an attendant.

Another object of the present invention is to provide an internal combustion engine having a crank chamber and integrally formed chambers under the crank chamber for the reception of the engine fuel supply and for a passageway from the suction pipe to the impelling pump.

In the present invention, I provide a lubricating oil container adjacent the carburetor and means whereby a small quantity of oil is metered into the inlet of the engine while operating.

A further object of the present invention is to provide an engine crank having ball bearings and sealing means thus to reduce the amount of oil needed to a minimum.

A still further object of my invention is to provide cooling fins on the cylinder and blades on the fly-wheel and having means for directing a blast of air between the cooling fins.

Another object of the present invention is to provide an impeller fuel pump which can be made largely of aluminum and an engine wherein the housing and cylinder proper are made from aluminum, the cylinder having a steel sleeve for contact with the piston and further to provide an automatically controlled carburetor and throttle valve.

The above recited objects are accomplished by means of parts, combinations of parts, or their equivalents, and mode of operation, as hereinafter set forth and claimed and shown in the accompanying drawings in which:

Fig. 3 is a horizontal offset view of the device on line 3—3 of Figure 2.

Fig. 4 is a transverse vertical sectional view of the carburetor and its controlling means.

Fig. 5 is a transverse vertical section of a fraction of the carburetor and taken through the center of the lubricating oil device.

Fig. 6 is a partially sectioned view of the carburetor and lubricating oil retainer illustrating a fraction of the engine cylinder.

Fig. 7 is a sectional view through the lubricating oil metering valve taken on line 7 of Figure 6.

Fig. 8 is a horizontal section through the cylinder taken on line 8—8 of Figure 1.

Fig. 9 illustrates the clutch mechanism viewed from the engine side.

As thus illustrated, the engine cylinder 9 and upper half of crank case 10 is preferably cast from aluminum, the cylinder having spaced fins 11 for cooling the cylinder by means of a blast of air as will hereinafter appear.

Figure 1:
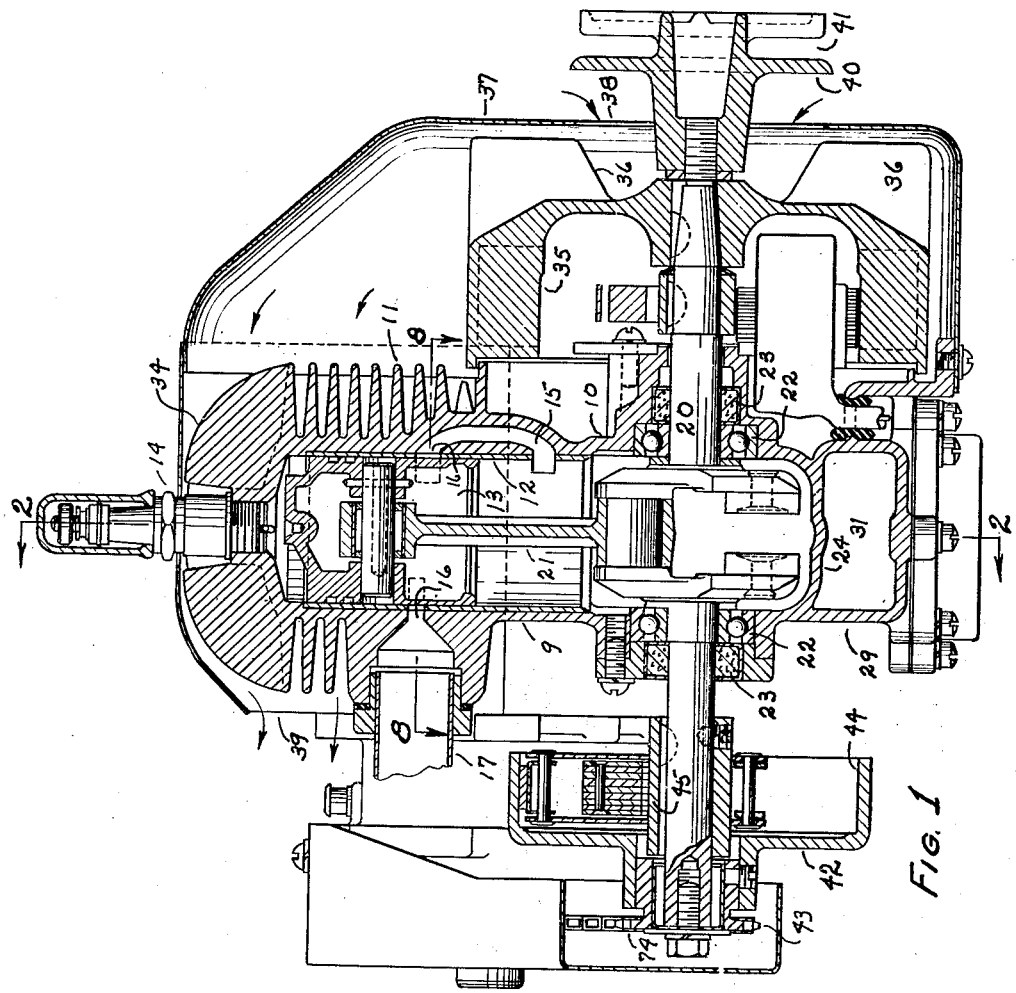
Fig. 1 is a longitudinal vertical sectional view of my device taken on the cylinder and crank centers.
Figure 2:
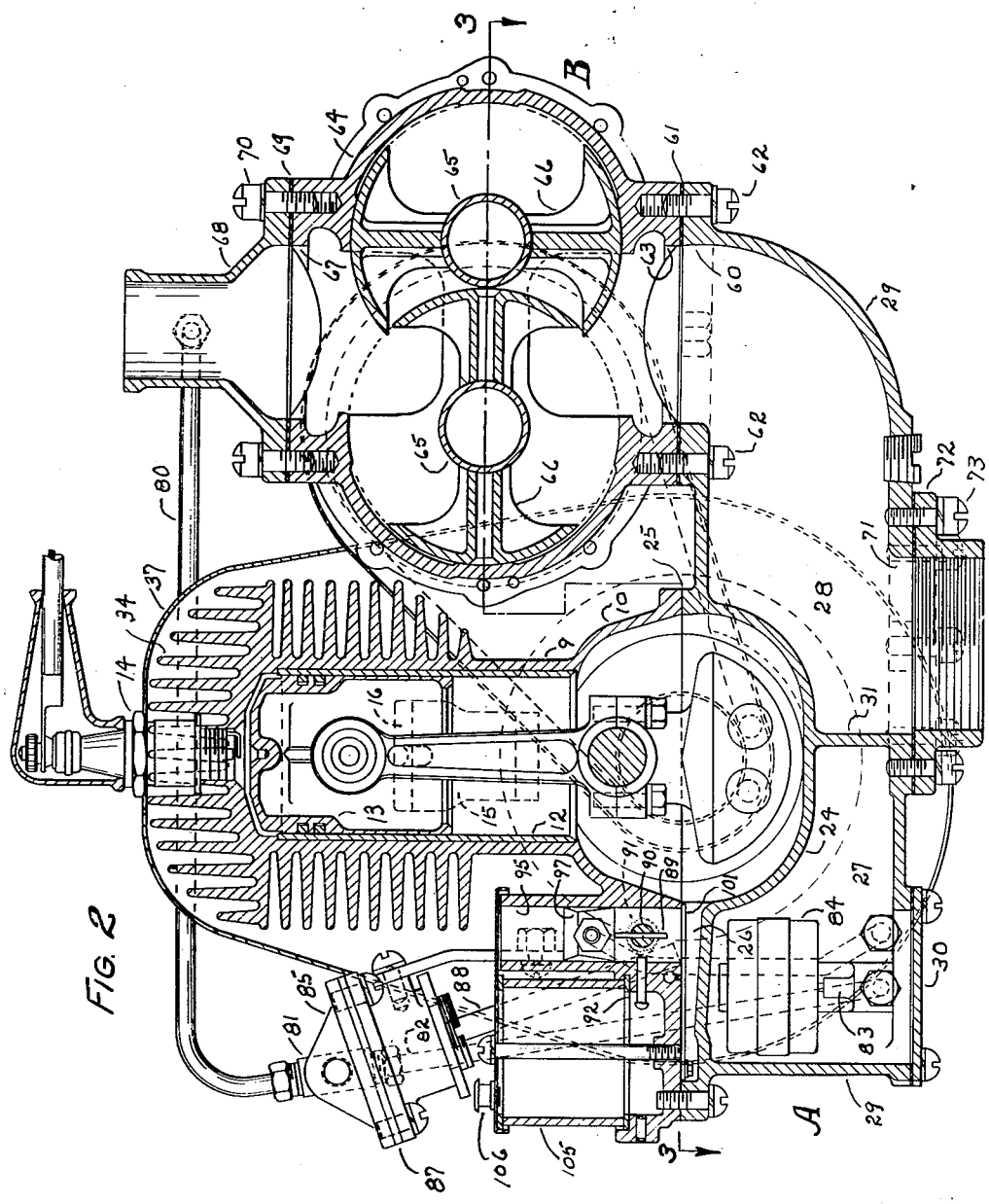
Fig. 2 is a transverse sectional view of my device, taken on line 2—2 of Figure 1.

The cylinder is provided with a wearing sleeve 12 and a piston 13, the piston being shaped about as illustrated in Figures 1 and 2. In the top of the cylinder, I provide a conventional spark plug 14 which is supplied with an impulse or impulses of electric current from an electric device too well known to require further description.

By referring to Figure 1, it will be noted that the engine is what is commonly called "two cycle" having a port 15 which registers with a port 16 in sleeve 12. Port 15 is uncovered at its top when the piston is in its lowest position as is the custom in two cycle engines of the class. The exhaust port 16 is positioned on the opposite side of the cylinder from the top of port 15 and extends through the wall of sleeve 12 and cylinder 9 into an exhaust pipe 17.

The crank shaft of the device is designated by numeral 20 and is connected to the piston by means of a connecting rod 21, the crank being mounted on ball bearings 22—22, each having sealing means 23—23 to prevent leakage between the crank chamber and the exterior.

The lower part of the crank chamber (see Figure 2) is provided with a partition 24 which is gasket sealed and bolted to the upper part of the crank case as at 25. Member 24 is shaped so as to provide a passageway 26 which extends under the upper half of the carburetor as illustrated in Figure 2.

In the figures, the bottom half of the crank case in its entirety is designated by reference character A and is provided with a carburetor chamber 27 and an induction pump inlet chamber 28 formed by an outer wall 29, the bottom plate 30 and a partition 31.

I provide a fly-wheel 35 on one end of crank 20 having spaced blades 36 arranged to act as a blower fan, the air being directed around the cylinder by means of a housing 37 having an opening 38 for an air inlet to the fan, the upper portion of the housing being shaped substantially as illustrated in Figures 1 and 2 so as to direct the air blast around the cylinder and between fins 11, as indicated by arrows. The upper end of the cylinder is provided with fins 34 which are positioned as shown in the line of air movement as indicated by arrows, the air being discharged at opening 39 at the opposite side of the engine.

Preferably on the fly wheel end of crank 20, I secure sheave 40 having a groove 41 into which a rope or cable may be wound with which to start the engine. On the other end of shaft 20, I provide an outer clutch member 42 having a sprocket 43 on its outer end and an inner surface 44 adapted to be engaged by a centrifugally operated clutch as follows:

I secure a hub 45 to shaft 20 (see Figure 9) and hingedly mount weights 46—46 to this hub as at 47. Brake bands 48—48 are hingedly mounted on arms 49—49 which are an integral part of member 45 as at 50—50. Members 48 are supplied with suitable fabric strips 51.

Near the free ends of members 48 I hingedly connect links 52—52 as at 53, the inner ends of these links being connected to member 46 as at 54—54. It will be seen that an outward movement of weights 46 will force bands 51 in contact with surface 44.

I provide springs 55—55 which are suitably secured to members 49 as illustrated in Figure 9 and to the free end of members 48 thus to yieldingly counteract the outward movement of members 46, the springs being adapted to permit engagement of the clutch at a predetermined speed for a purpose as will hereinafter appear.

I provide an outlet opening 60 for port 28. On this opening I bind and seal preferably a rotary pump, which in its entirety is designated by reference character B by means of a gasket 61 and bolts 62. Port 63 forms a connection between outlet 60 and the inlet side of the pump, the pump proper comprising a housing 64 suitably machined for the rotatably mounted shafts 65—65 and for pump rotors 66—66.

At the top of housing 64 I provide an outlet 67 on which is mounted an outlet bracket 68 by means of gaskets 69 and bolts 70. Chamber 28 is provided with an inlet opening 71 and to this opening I secure a flanged member 72 by means of a suitable gasket and bolts 73. Member 72 is provided with a suction pipe (not shown) of a length suitable for extending into the fuel barrel and to within a very short distance from the bottom thereof so practically all of the fuel will be removed from the barrel when the pump is in operation and discharged through outlet bracket 68 through a flexible hose connection (not shown) somewhat similar to the hose connection and nozzle supplied on filling station pumps. The nozzle is provided with a valve so when the airplane tank is full or the barrel is empty, the nozzle may be closed.

The pressure that accumulates in outlet bracket 68 is adapted to supply fuel to the carburetor and control the engine speed as will hereinafter appear.

Clutch sprocket 43 is operatively connected to one of the shafts of pump B by means of a chain 74 and a sprocket 75 which is secured to one of the shafts of pump B, the other shafts of the pump being operatively connected to the first shaft by means of suitable gears (see Figure 3).

When the engine is reduced to a predetermined speed because of the pressure in bracket 68, as will hereinafter appear, the clutch will be disengaged and the pump will stop operating so the operator may either insert the suction pipe into another barrel or carry the outfit to another airplane or the like for filling the fuel tank thereof.

It will be understood that I have illustrated the preferred form of fuel pump and preferred connection from this pump to the clutch. I may however equip my device with other designs of fuel pumps and power connections thereto. In either event, the operation of the device will not be affected.

The operation of my carburetor speed controlling means and oil feed is as follows:

I provide a fuel line 80 which leads to a T fitting 81 having a fuel connection 82 which leads to the carburetor valve 83 which is controlled in the usual manner by means of a float 84; thus to maintain a suitable level of fuel in chamber 27.

The side outlet of fitting 81 is screwed into a cap 85 which forms the cover of a member 86. There is positioned between these two members a diaphragm 87 having a rod 88 which extends downwardly and controls the throttle valve 89 as follows:

Valve 89 is mounted on a shaft 90 (see Figures 4 and 6) having a pinion 91 and member 88 is supplied with teeth forming a rack which engages the teeth on pinion 91. The position of rod 88 will therefore determine the position of valve 89. The object of this construction is to hold the valve open by means of a spring 93 when there is a certain pressure in chamber 94. This pressure is caused by the weight of the fuel in the flexible tube connected to member 68 and when the nozzle valve on the end of this tube is closed, diaphragm 87 will act to close valve 89.

Spring 93 is adapted to close valve 89 when there is no pressure in chamber 94. Member 87 is made of material which will make it delicate in its operation and spring 93 is delicate and having adjusting means, as illustrated, so the operator can adjust the spring and determine the pressure which will hold the valve open. Clearly when the tank being filled is full and the delivery valve is closed, the engine will be reduced to a predetermined idling speed, the idling speed being low enough to cause weights 46 to disengage the clutch, this clearly will result in discontinuing the operation of the pump and when the valve in the nozzle is again opened, for purposes which will be obvious, the pressure in chamber 94 will again be reduced to a point where the engine will speed up and the clutch will be engaged so as to drive the pump. Clearly the operation of the pump will be determined by the position of the valve in the nozzle of the fuel pipe or the weight of the oil in this pipe.

It will be seen that because of the rack on the end of rod 88 and the pinion 91, the valve may be closed by an extreme movement of the diaphragm in either direction, that if the nozzle valve is closed, excessive pressure in chamber 68 will close valve 89 and immediately upon opening the nozzle valve, valve 89 will again be opened and that if there is no pressure at all in chamber 68, valve 89 will be closed because the rack will act to turn the valve from its open position to its closed or idling position in either direction.

I provide a pin 92, the end of which is adapted to prevent the valve from entirely closing when in either extreme direction or prevent it from passing the closed center and open again. It will be seen that the idling position of valve 89 will be determined by pin 92 and that the idling speed of the engine is therefore determined by this pin. It will also be seen that lack of a predetermined pressure in chamber 68, or excessive pressure in this chamber, because of the nozzle valve being shut will cause the engine to be reduced to idling speed and the pump will be stopped.

My carburetor and lubricating oil devices are preferably made in two parts, the fuel chamber being cast integral with the bottom half of crank case A and the upper half is preferably cast integral with the upper half of the crank case (see Figure 2).

The upper half of my carburetor is provided with an inlet 95 having a cap 96 positioned over this inlet so as to prevent dust from dropping into the inlet but permit sufficient air to enter for operating the engine (see Figure 4). I provide a venturi shaped sleeve 97 in opening 95 having an inlet nozzle 98 which is operatively connected to chamber 31 by means of a tube 99.

I provide a needle valve stem 100 which, in the usual fashion, will more or less open the outlet in member 98 so as to regulate the fuel drawn from chamber 31 because of the vacuum caused by Venturi sleeve 97; thus when the air rushes downwardly through the Venturi sleeve, a predetermined quantity of fuel will be drawn into the air current as it passes member 98. Opening 95 extends down to the bottom of the casting and this opening is closed at its bottom by means of a reed valve 101 which is secured to the casting by means of a bolt 102 (see Figure 5).

Chamber 26 provides room for valve 101 to open during the suction stroke of the engine (see dotted lines in Figure 5). When valve 89 is closed for idling, clearly reed valve 101 will also be closed for idling.

I provide means for supplying a suitable amount of lubricating oil to the engine as follows:

The upper half of the carburetor is shaped for the reception of a glass tube 105 supplied so the operator may observe the amount of lubricating oil in the chamber. A suitable filler cap or plug 106 is provided.

In the bottom of the lubricating oil chamber, I provide an outlet opening 107 having an opening 108 adjacent member 95 and in the seat of reed valve 101. I supply an adjustable needle valve 109 so opening 107 may be more or less closed so as to supply the desired quantity of lubricating oil to the engine, the oil being permitted to flow into the crank case with the air passing through opening 95 because of the position of valve 101.

Clearly when the engine is not operating, there will be no oil supplied to the engine because opening 108 will be closed by valve 101. The desired quantity of oil supplied to the engine when operating can be secured by adjusting valve 109.

Obviously the speed of my engine may be controlled manually instead of by diaphragm 87 and its connection to the pump outlet. Such control is too well known to require further illustration or description.

It will be seen that the speed of the engine may be controlled automatically, the operation of the pump is automatic as determined by the speed of the engine and the supply of oil to the engine is controlled automatically. Clearly the engine, pump, carburetor and clutch are light, easily manufactured at low cost, efficient and easily handled by the operator.

By scrutinizing Figure 2, it will be seen that inlet 71 is positioned near the center of gravity of the unit; thus the device will readily assume a vertical position.

Clearly the operator can place the pump suction pipe in various supply barrels or move the nozzle to various airplane fuel tanks for filling while the engine is idling and that the engine valve can be made to idle the engine automatically when there is no pressure in the pump outlet.

It will be understood that many minor detail changes may be made without departing from the spirit and scope of the present invention, as recited in the appended claims.

Having thus shown and described my invention, I claim:

1. A portable pumping unit of the class described, comprising an internal combustion engine, a fuel pump, an operating connection between the engine and pump having means whereby when the engine speed is below normal, said operating connection will be broken, an engine fuel controlling device having an operating connection to the outlet of said pump, a flexible hose connection to the outlet of said pump having a valve controlled nozzle and means whereby when the pressure in said pump outlet rises above normal said first controlling device will cause the speed of the engine to be reduced below normal to thereby stop the pump.

2. A portable pumping unit of the class described comprising an internal combustion engine, a rotary fuel pump, an operating connection between the engine and pump having means whereby when the engine speed is below normal, said operating connection will be broken, an engine fuel controlling device having an operating connection to the outlet of said pump, a flexible hose connection to the outlet of said pump having a valve controlled nozzle and means whereby when the pressure in said pump outlet rises above normal said first controlling device will cause the speed of the engine to be reduced below normal to thereby stop the pump, said engine being made from two aluminum like castings, one comprising a cylinder having external fins and an internal sleeve for wear contact with the piston and the upper half of the crank case, an oil chamber and said fuel controlling means being cast integrally into the upper crankcase at one side thereof, said pump being positioned on the bottom crankcase on the opposite side from said oil chamber and fuel controlling means, the bottom of said crankcase being separated into two chambers, one adapted to act as an inlet to said pump, and the other having a fuel level controlling means, said second operating connection comprising a tube connection from the outlet of the pump to the valve of said float and a fuel connection from said float chamber to said fuel controlling means.

3. An internal combustion portable engine pumping device of the class described, comprising an integrally cast cylinder and upper half of a crank case of aluminum like material, the lower half of the crank case being integrally cast of aluminum like material, and adapted to form a base for the engine, said upper half of the crank case having integrally formed therein a lubricating oil chamber, and a fuel controlling means, a rotary pump secured at one side to the lower half of said crank case, a chamber formed in one end of the lower half of said crank case having a fuel controlling valve and float, another chamber in the other side of the lower half of said crank case forming an inlet to said pump, said last chamber having a suitable tube adapted to be operatively connected to the source of supply, a flexible outlet to said pump having a valve, a connection between said pump outlet and fuel controlling means with means whereby when the pressure in the pump outlet increases beyond a predetermined amount, the engine will be automatically reduced to a predetermined idling speed, an operating connection between the engine and pump having means whereby when the engine is reduced to a predetermined idling speed the pump wil be automatically stopped.

4. A device of the character described comprising a miniature unit including an internal combustion engine, a pump, an engine fuel controlling means, and a centrifugally controlled friction clutch, an operating connection between said pump and clutch and means whereby when the engine is reduced to a predetermined idling speed, the clutch will act to stop the pump, said pump having a suction inlet adapted to be operatively connected to a source of supply and a flexible tube outlet having a valve, a connection between said outlet at the pump and the fuel controlling means, and means whereby when the pressure increases above a predetermined amount in the outlet of the pump, the engine will be reduced to a predetermined idling speed.

WILLIAM F. KRENZKE.